United States Patent [19]

af Strom

[11] Patent Number: 5,032,449

[45] Date of Patent: Jul. 16, 1991

[54] DECALS AND PROCESSES FOR TRANSFER OF IMAGES TO SUBSTRATES

[76] Inventor: Oscar R. F. af Strom, Av. Residencial Chiluca 207, Club Campestre Chiluca, Atizapan, Mexico

[21] Appl. No.: 590,589

[22] Filed: Sep. 25, 1990

Related U.S. Application Data

[63] Continuation of Ser. No. 301,846, Jan. 26, 1989, abandoned.

[51] Int. Cl.[5] .................... B32B 3/00

[52] U.S. Cl. .................... 428/195; 428/40; 428/201; 428/914

[58] Field of Search .................... 427/147, 149, 152; 428/40, 76, 195, 201, 202, 211, 306, 308.8, 409, 514, 537.5, 914

[56] References Cited

U.S. PATENT DOCUMENTS

| | | | |
|---|---|---|---|
| 2,629,679 | 2/1953 | Rathke | 428/914 |
| 3,334,003 | 8/1967 | Edwards | 156/235 |
| 3,344,012 | 9/1967 | Af Strom | 428/914 |
| 3,350,254 | 10/1967 | Morgan et al. | 156/235 |
| 3,385,748 | 5/1968 | Neal et al. | 428/914 |
| 3,981,761 | 9/1976 | Kojima et al. | 156/235 |
| 4,522,864 | 6/1985 | Hamason et al. | 428/201 |

FOREIGN PATENT DOCUMENTS

| | | | |
|---|---|---|---|
| 555927 | 4/1958 | Canada | 156/235 |

*Primary Examiner*—James J. Seidleck
*Assistant Examiner*—J. Weddington
*Attorney, Agent, or Firm*—John D. Upham

[57] ABSTRACT

Decals and process for transfer of images to substrates. A paper base is provided, of which at least one side has been sized and one side only has been treated with pigmented adhesive coating, whereby the pores throughout essentially the whole of the paper's cross section have been filled and the coating and the paper firmly bonded together. The uncoated side is not substantially porous and is essentially free from filler material. An image and a plastic film, in either order, are applied on the non-coated surface and not penetrating the same, the said paper when wet being easily releasable from the film/image, from which it may be removed in essentially one piece or a few large pieces, thanks to the bonding effect of the sizing and the pigmented coating. The resulting decal can be applied to substrates in various ways.

19 Claims, 3 Drawing Sheets

DECALS AND PROCESSES FOR TRANSFER OF IMAGES TO SUBSTRATES

This is a continuation of application Ser. No. 07/301,846 filed Jan. 26, 1989 entitled DECALS and PROCESSES FOR TRANSFER OF IMAGES TO SUBSTRATES.

BACKGROUND

Traditionally, the transfers of images, or, as they are known within the industry, decals, are of two types: those which have a dry release and those which have a wet release. This invention is related to decals with wet release. Those which are available in the market, have an image printed on a paper which has previously been covered with a layer soluble in water. When the decal is soaked with water and pressed on a substrate, on the surface of which the image is to appear, this layer dissolves and becomes soft, so that the paper may be removed, usually by sliding or lifting, leaving the image on the desired surface.

The paper on which the image is printed is known as a wet release decal paper, normally made up of a paper of good quality which is coated with a water soluble emulsion, e.g., starch and gum. The paper may have been specially treated in order to neutralize contraction and expansion due to metereological conditions. The coated paper is known as a "simplex" paper. If it is made to adhere to another paper, it becomes a stronger kind of decal paper, known as a "duplex" paper.

The image may be printed on the decal paper with known methods, such as printing, copying or drawing directly or in reverse, depending on the final surface. Normally, the printer begins by application of a coat of lacquer or varnish on the decal paper surface. Thereafter, he prints the image on the lacquer. Instead of printing directly on the decal paper, the image could also be transferred from another paper, on which it had been applied with known methods. Normally, the decal is applied on the desired substrate with the use of an adhesive, varnish, emulsion or solution of special kind, etc. Before applying the decal, it is submerged in water for a short while, whereafter the decal is applied in its exact position and the paper is slid off. The sliding-off results from the dissolution in water of the decal's water soluble layer.

As a variation, a decal paper is also made with a lacquer or varnish coat already over the water soluble layer. On this type of decal paper, it is possible to print directly on the coat of lacquer or varnish.

A transfer resulting from a decal on which the image has been applied directly on the decal paper surface is called a "direct transfer". On the other hand, if the decal has an image which has been transferred from another paper, on which it was originally applied, the transfer to the substrate is called an "indirect transfer."

Dry release decal papers, rather than coating the paper with a water soluble layer, rely on a coating of a dry release material such as silicone, polyethylene, or other material that has little affinity for the layer of lacquer on which the image is to be printed or transferred. After application of the image to the final substrate, the paper backing of the decal is stripped off with the dry release layer adhering to it.

The foregoing description is largely directed to decals carrying images and made in factories to be sold to users who effect the final transfer to a substrate. Such users may be producers of consumer products, e.g., T-shirts, or producers of metal or plastic items onto which instructions, labels or decorations are to be applied by decal, or hobbiests or artists who transfer to canvas, cloth, ceramics, wood or metal. The ultimate user, however, may be involved in part of the manufacture of the decal itself, particularly in indirectly transferring a picture or other image first to the coated wet release decal paper or the dry release decal paper to form the decal itself, and then in transferring same to the substrate.

In addition to the usual wet release paper carrying a water-soluble coating of, e.g., dextrine, starch and/or gum, which acts as a release layer when wetted, it has been suggested to use conventional coated papers, in which the paper is first sized, as with starch, then a coating comprising adhesive binders, pigments such as clay, casein or other fillers, is coated on one or both sides of the paper. Such papers are designed for printing on the coated side resulting in high-gloss printing suitable for magazine covers and art reproductions. When used as a wet release decal paper, the coating serves to minimize penetration of the image into the paper, and on wetting acts to release the paper from the film carrying the image. See Edwards U.S. Pat. No. 3,334,003; Morgan et al. U.S. Pat. No. 3,350,254.

A transfer utilizing a clay (and/or other pigment) coated paper sometimes works well if the coating is easily removed with water, as long as the transfer is indirect and to an opaque surface. However, if transparency is required, or the transfer is direct, the film carrying the transferred image must be thoroughly cleaned. This is due to the fact that not only does the image transfer, but also part of the clay and binder coating on which the image was originally printed. Sometimes even a portion of the paper fibers and pigmentation may transfer. All of this results in a transferred image which is obscured by a semi-opaque white layer. Normally, it is not possible to clean away this layer with water only, and a more potent solution is required. Sodium hydroxide may be utilized for this task, as is mentioned in some of the patent descriptions referring to such transfers.

THE INVENTION

The present invention utilizes a dry paper sheet base in which the pores of the paper have been filled with solid material such that a surface thereof is not substantially porous, i.e., the pores thereof have been substantially sealed, but said surface is essentially free from non-water-soluble opaque filler material. A plastic film is applied to said non-porous surface, but does not penetrate the same, even if the film is applied as an aqueous emulsion of a film-forming polymer or in other liquid form and then solidified, because of the fact that the pores of the paper have been filled. An image to be transferred is applied either on said non-porous paper surface before applying the plastic film, or on the plastic film after it has been applied, or both. The paper when wetted is easily releasable from the film and image(s).

A convenient way of providing the paper sheet base is to subject a bond paper, or preferably a somewhat harder paper, to coating only on one side with an adhesive, or with an adhesive plus pigments as is customary in preparing coated papers.

Before such application of coating, the paper is ordinarily sized to improve water resistance. Sizing may be internal, i.e., the sizing, such as rosin and alum, is mixed with the paper fibers before formation of the web. Other materials may also be mixed with the fibers, such as starch and pigments. Or the sizing may be externally applied, as by treating one or both sides of the web with starch or other gums, e.g., polyvinyl alcohol, guar gums, that are water-soluble or readily water-dispersible. Opaque materials that are not water-soluble or dispersible should not be used on the side to which the plastic film is to be applied. The sizing material, internally or externally applied, will to some extent fill or seal pores in the paper surface, but after sizing the paper will still be somewhat porous.

The coating applied on only one side may be just an adhesive binder material, such as water-soluble binders, e.g., starches, or proteins from milk (casein) or soybeans, or such as latex binders, e.g., styrene/butadiene, polyvinyl acetate, or acrylic latices. Preferably mineral pigments are admixed with binder to provide the coating. Clay is the least expensive pigment and is almost always used. The other most commonly used pigments are calcium carbonate and titanium dioxide.

Sizing and coating operations and materials are well-known in the paper-making art. See: "Paper and Paperboard-Manufacturing and Converting Fundamentals," James E. Kline, Miller Freeman Publications, Inc., San Francisco, pp. 127–150.

As the coating is applied to the one side of the paper, the coating ingredients penetrate the pores of the paper to a sufficient extent that the pores of the opposite, non-coated side are substantially sealed giving a non-porous surface. The coated side will be glossy while the uncoated side will be dull. Unless amounts and/or pressure not customary in paper making would be used in preparing the coated side, the pores of the paper are filled but the surface of the uncoated side is essentially free from the filler material. It is postulated that the paper acts as a filter that limits the passage of materials to the other side, and that the non-coated surface somehow acts as a barrier to limit passage through the surface to the outside. When a plastic film is applied to the uncoated side it adheres to the paper but does not penetrate, and the paper when wetted is easily separated from the film.

When I say that the pores of the paper are filled, or that the pores on the non-coated side are sealed, or that the non-coated side is non-porous, this is not meant in the absolute sense, but in the functional sense that this is sufficiently so to prevent the applied acrylic emulsion or other liquid form of polymer (that on drying will form a plastic film) from penetrating to such an extent as to prevent a rapid release of wetted paper from film. A solution of film-forming polymer has a considerable viscosity, so that filling or sealing of pores such that substantial penetration of the uncoated surface will be inhibited will still allow water, with a much lower viscosity, to penetrate quickly when the paper is wetted.

It is perhaps theoretically possible to apply just enough filler material (size, pigment, adhesive) to fill the pores and leave none on either side of the paper. Or one could use an excess then scrape the surface to remove the excess, though this would be expensive and likely to leave residual filler material on the surface or damage the paper. However, the pore-filling procedure is forgiving, and it is preferred and gives reproducible results to leave the coating. The coating of the one side, opposite to the side onto which the plastic film is to be applied, serves another, important purpose. By being solidly bonded to the surface of the paper by the sizing and the adhesive holding the coating pigments (if any) together, it reinforces the paper and makes it possible to remove it in one or a few large pieces, rather than in small pieces, when the plastic film and the paper are being separated from each other. This is very important to the practicality of a decal.

A feature of my invention is that the surface of the uncoated side of the paper is essentially free from filler material. Mineral pigments are opaque and water-insoluble. If present on the surface to which the plastic film is applied, sufficient pigment will adhere to the film, when the paper has been wetted and lifted, to cover the film or to create areas or blotches on the film which will disfigure the image when positioned on the substrate. Material on the surface that is transparent when dry, or that is water-soluble and thus largely or completely dissolved when the paper is wetted and separated and thus carried away with the paper or wiped off when the separated film is dried, is not a problem; an example would be starch sizing that might adhere to the surface.

The plastic film is applied to the non-coated side of the paper, as an aqueous emulsion of a film-forming polymer, e.g., an acrylic emulsion, or a polyvinyl chloride emulsion including emulsions of vinyl chloride/vinyl acetate copolymer. Or a lacquer with an organic solvent base may be used. The liquid in any case is allowed to dry in air, or with the aid of heat, to form a solid film, usually accompanied by curing, i.e., polymerizing or cross-linking.

A water emulsion of acrylic polymer has proved to work well in forming the plastic film. The emulsion may have a solids content of say 40 to 50%, dispersed in water with the aid of a suitable nonionic emulsifier. A very small amount of suitable defoaming agent that prevents formation of bubbles or the so called "orange peel" effect as the coating dries should be added to the polymer. One commercial product is Rhoplex AC-33 (Rohm and Haas Company, Philadelphia, Penna.), an aqueous emulsion of an acrylic polymer having a solids content of 46 to 47 percent, a pH of 9.4 to 9.9, a weight per gallon of 8.9 pounds, and a minimum film-formation temperature of 9 C. Rhoplex B-60A is also suitable.

Alternatively, a thin pre-formed plastic film—say 1 to 5 mils in thickness—such as a vinyl or polyurethane film, may be laminated to the non-coated side of the paper with the aid of an adhesive and/or heat and/or pressure.

When one is laminating with heat and pressure a pre-formed plastic film to the non-porous side of the coated paper, a protective sheet is placed between the heat source (such as a domestic iron) and the paper. I have found that if a release paper, such as a silicone release paper, is used as the protective sheet, uncontrollable bubbles appear in the laminate. Use of a very open (porous) paper, such as tissue paper or a paper napkin, as the protective sheet, avoids this by permitting ventilation of the gases created by the heat. The temperature and ironing time are kept within limits (readily determined in any given case by simple experiment), so as to prevent the plastic film from becoming liquid, as it then under the heat and pressure penetrates even the otherwise substantially non-porous surface of the paper sheet base to such an extent it is not possible to separate the two.

One skilled in the art, having been given the benefit of the present disclosure, can readily determine by simple experiment suitable combinations of paper, filler material and plastic film that will provide ready release on wetting.

The image may be applied directly to the non-coated side before application of the plastic film, as by painting, letterpress printing, xerographic printing including the new so-called laser color printers, or in any other manner. Alternatively, the image may be similarly applied to the plastic film. Of course more than one image may be applied, and this normally occurs in color printing. Images may also be applied both to the paper and to the plastic film. If a pre-formed film is to be laminated to the non-coated side of the paper, it could carry image(s) on either or both sides.

The image(s) can be transferred to the desired substrate in a number of different ways. In any event, the paper will be wetted, conveniently by soaking in water for a short time (from less than one minute to about five minutes). The film plus wetted paper can be readily manipulated, yet they separate very easily. The wetted paper can be peeled (lifted) off more or less intact. I have found that this separation occurs not only more cleanly but also more rapidly than in the case where the film is applied on the coated side of the paper.

In one procedure, the decal sandwich is wetted, the paper removed, and the film-plus-image applied to the substrate. In another procedure, the wetted decal is applied to the substrate (plastic film against the substrate) and the paper then removed. In another procedure, the dry decal is applied to the substrate, then the paper base wetted and removed.

In all of the applications, it is permissible and often desirable to utilize adhesives between layers, e.g., between paper and image, paper and plastic film, plastic film/image and substrate.

DRAWINGS

The drawings are amplified diagramatic cross-sections of various decals and parts thereof, illustrating various aspects of the invention.

FIG. I shows a dry paper whose pores have been filled as a consequence of applying a coating on one surface, the other surface being non-porous and free from filler.

FIG. II shows the same, with a plastic film on the non-coated side of the paper.

FIG. III shows the paper of FIG. I, with first an image and then a plastic film applied over the image and not penetrating the non-porous surface of the paper.

FIG. IV is in a sense the reverse of FIG. III, with the plastic film applied first and then the image.

FIG. V shows the decal of FIG. III, with the wetted paper base being pulled away from the film/image layer.

FIG. VI shows the decal of FIG. IV being applied to a substrate, with the wetted paper base being lifted from the film/image layer.

FIG. VII shows the decal of FIG. III, with the film/image layer transferred to an intermediate transfer sheet, the wetted paper base of the FIG. III decal being lifted from the film/image layer.

FIG. VIII shows the film/image layer on an intermediate transfer sheet as shown in FIG. VII, but with the wetted paper base removed and the film/image layer covered with a heat-activated adhesive polyester film and an ironing tissue over the polyester film.

FIG. IX shows FIG. VIII but with the intermediate transfer sheet and the ironing tissue removed.

FIG. X shows the decal of FIG. IX applied on a substrate.

It will be appreciated that the Figures are merely diagramatic. In actuality the paper sheets may range in thickness from simple writing paper to considerably thicker paper boards. The coating, plastic film and image layers are quite thin, ranging from less than a mil (one thousandth of an inch) to several mils, e.g., 5 mil, in thickness.

DETAILED DESCRIPTION

Figure 1:
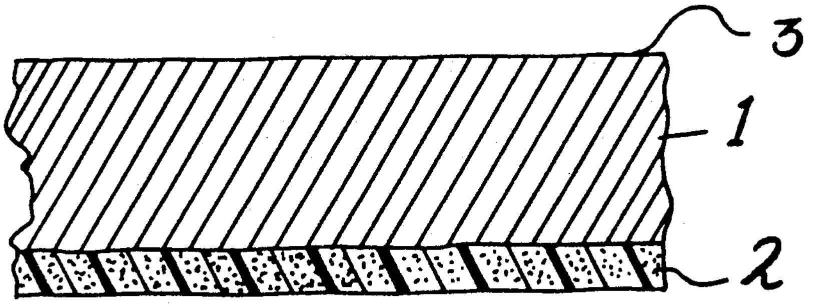
Figure 2:
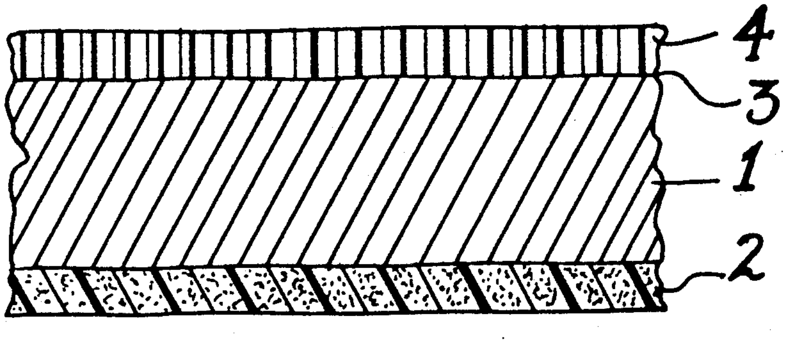
Figure 3:
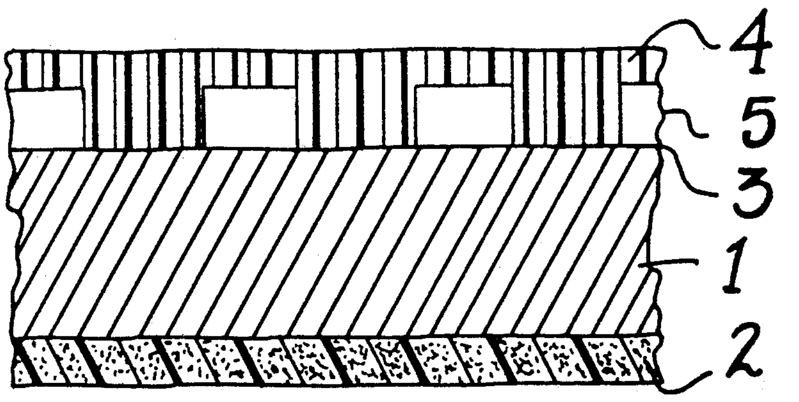
Figure 4:
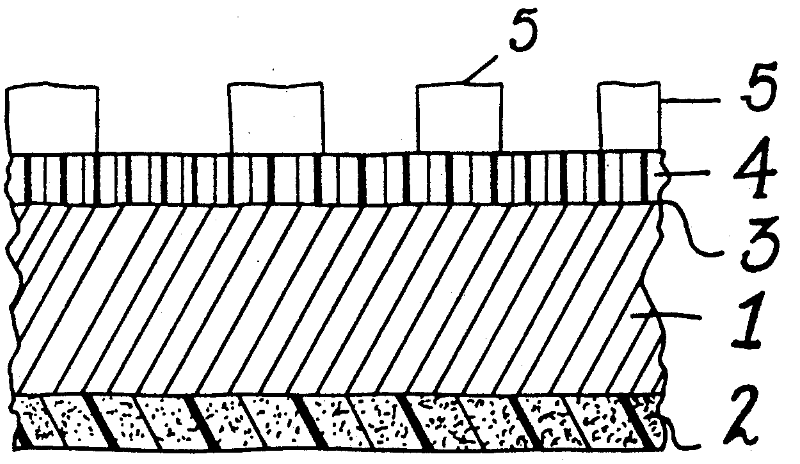
Figure 5:
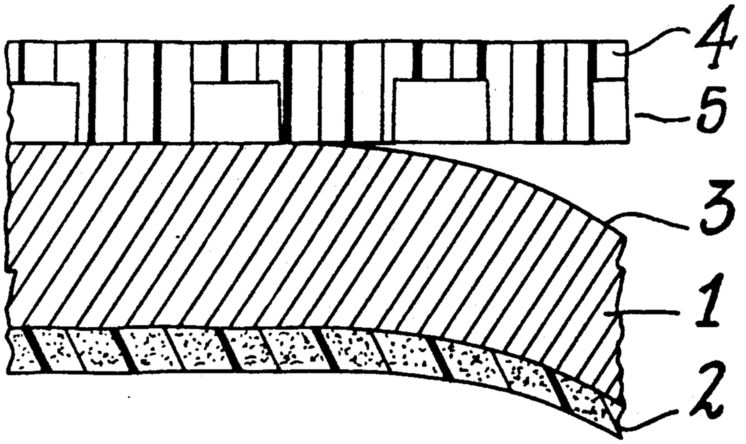
Figure 6:
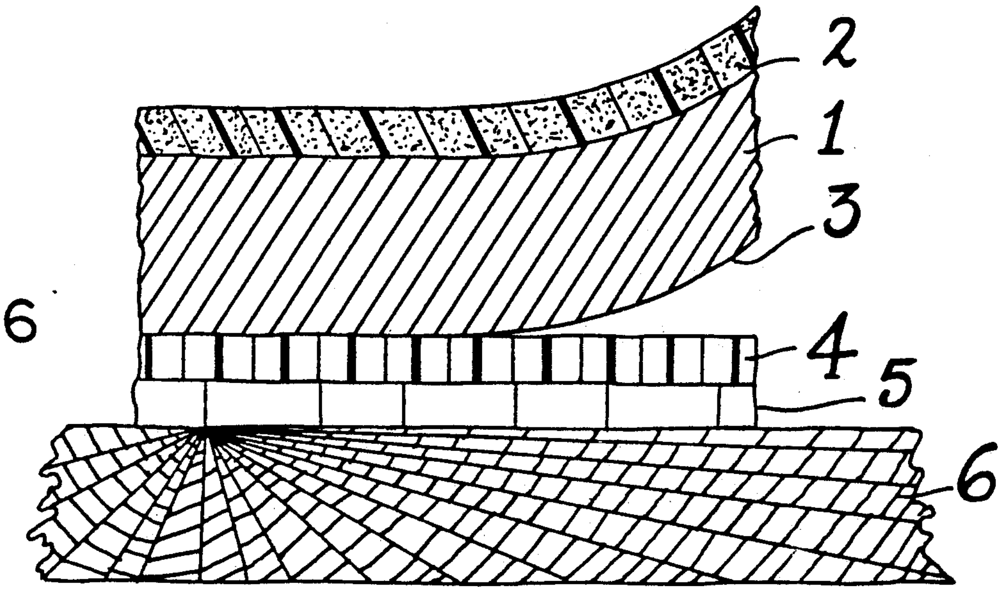
Figure 7:
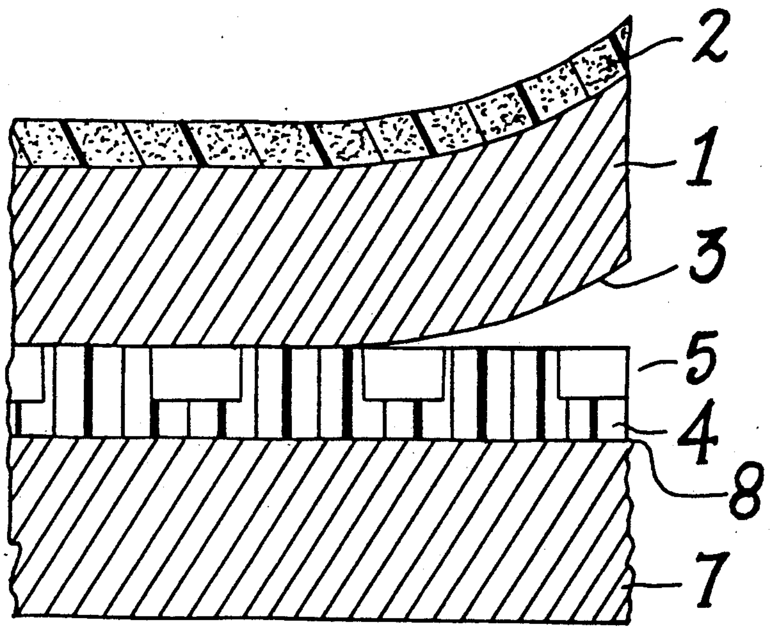
Figure 8:
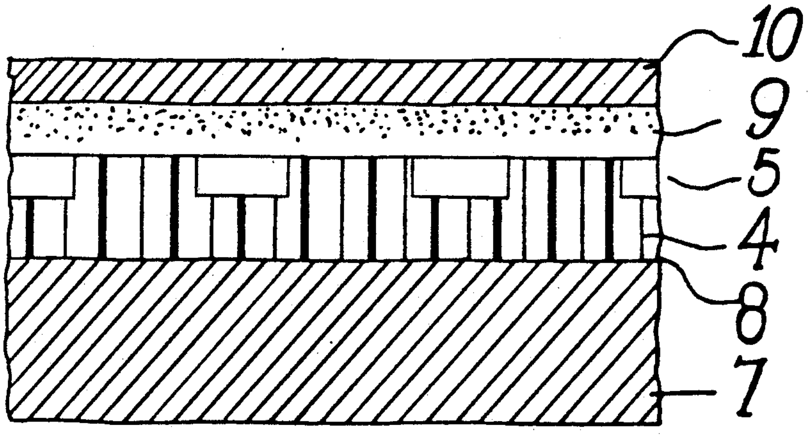
Figure 9:
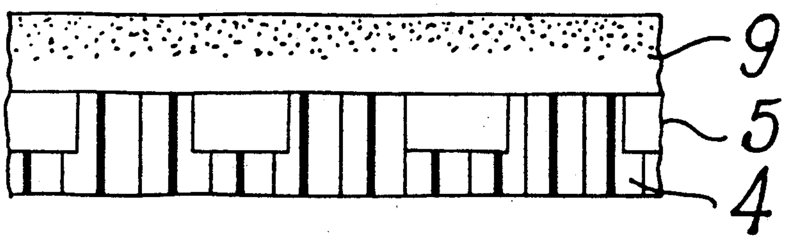
Figure 10:
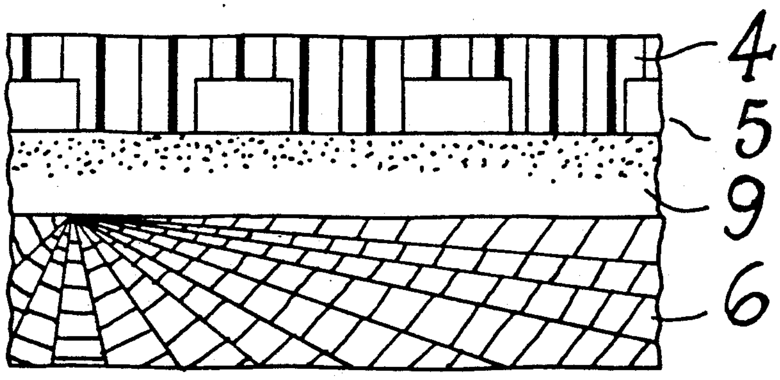

FIG. I illustrates the preferred paper sheet base used in the invention. Application of a coating (2) of filler material to one side of a sized paper (1) has caused the pores of the paper to be filled without much effect on the uncoated side 3 of the paper, which is now substantially non-porous but essentially free from coating substance. This operation is practiced commercially. Suitable size is, among others, starch, gums and polyvinyl alcohol. For the coating, clay, calcium carbonate and titanium dioxide, together with an adhesive, such as starch, latex, polyvinyl acetate and acrylics, may be used. It is within the skill of the art to choose formulations and application procedures suitable to prepare papers for use in this invention.

FIG. II illustrates the paper of FIG. I, upon the uncoated side (3) of which a plastic film (4) has been applied. Most conveniently this may be done by coating with an emulsion of a film-forming polymer, e.g., an acrylic emulsion of, say, 40 to 50 weight per cent solids, the remainder being largely water. Such emulsions are available commercially in a great variety of formulations in which the particular polymer or mixture of polymers, emulsifiers, plasticizers, air-activated polymerization catalysts, cross-linking agents, etc. and their concentrations are chosen to give optimum balance of properties for various uses. The liquid formulation quickly dries, in air or with the aid of a heating oven, to a solid plastic film that does not penetrate the non-porous surface of the paper. The paper, when wet with water, is easily releasable from the film. As indicated earlier, other plastics in liquid form may be used, or pre-formed plastic films may be laminated to the paper surface, normally with the aid of heat and/or adhesive.

FIG. III shows the paper of FIG. I, upon the non-coated side (3) of which have been applied, in succession, an image (5) and a plastic film (4). A plastic film onto which an image has first been applied could also be applied to surface (3) to give a decal represented by FIG. III.

In FIG. IV, the sandwich of FIG. II has had an image (5) applied to the plastic film (4).

In FIGS. III and IV the film (4) and image (5) are shown as discrete layers. Depending on their natures and thicknesses, in practice they may tend to blend into a film layer in which the components may not appear, even with magnification, to be separate. FIG. III shows that if image is applied first, the film will tend to fill any interstices and be in direct contact with the paper surface. In any event, because the pores of the paper were filled, neither the plastic film nor the image has penetrated the paper surface which, therefore, when wetted is easiliy releasable from both image and plastic film. If one uses polymer inks for the image and a compatible plastic coating or laminated film, the ink layer may co-polymerize or cross-link with the film or be absorbed thereby, resulting in a plastic film with the image forming an integral part thereof.

In FIG. V, the decal sandwich of FIG. III has been soaked briefly in room-temperature water and the paper base (1) is being pulled away from the image and film. The non-porous surface (3) of paper (1) very easily releases. Coating (2) is shown intact, and in practice will stay so during the short period required to obtain release. In fact, if the coated surface (2) is roughened slightly, the paper gets quickly saturated with water, and takes on a darker tone. However, it does not disintegrate, and may be removed or lifted off from the film-/image in one piece or a few large pieces. This is due to the fact that the size and pigmented adhesive coating is water resistant to some degree, and keeps the paper (1) and coated surface (2) together as one unit, which stays together during the period required to obtain full release between the paper surface (3) and the film/image (4/5). An advantage of my invention is that a very short soaking time is required to obtain release; sometimes just a few seconds, and seldom more than a few minutes, e.g., 5 minutes. A prior patent in which image and film are applied on the coated side of a coated paper uses 30 minutes of soaking.

The film/image released as shown in FIG. V can be dried and applied to a substrate, usually employing an adhesive. In the case of PVC (polyvinyl chloride) or polyurethane film, it can be adhered to windows or other glass for decoration, or to a chalkboard in the school room for instruction, solely by clinging to the surface, presumably by electrostatic charges.

FIG. VI shows the application of the decal of FIG. IV, wetted, to a substrate (6), which could be glass, ceramic, wood, paper, or any other solid material. The paper base (1) is shown being peeled away, i.e., lifted, from the film/image (4/5) on the substrate (6).

FIG. VII shows a special application of this invention, used in conjunction with the invention disclosed in my copending U.S. patent application Ser. No. 07/061,199 filed June 10, 1987, the contents of which are hereby incorporated herein by reference.

It is sometimes desirable to use an intermediate transfer sheet to carry the film/image from a decal of the present invention to an ultimate use. An intermediate carrier is needed whenever one wishes to transfer a picture that has been printed "right." By direct application on the substrate, such as in FIG. VI, the transferred image will appear in reverse, i.e., as a mirror image. However, if it is first transferred to a transfer support (intermediate carrier), it will appear there in reverse and after re-transfer to the substrate, it will be seen right, i.e., as it was printed.

The aforementioned patent application teaches that a paper sheet base with porous surface may have applied to it a plastic film that will adhere well to the porous surface and adopt the texture of the same but not penetrate it, and that when the paper sheet base has been saturated with water the adhesion to the plastic film will be substantially released but they will withstand substantial forces in the plane of the sheet without causing separation. This allows ready handling of the decal sandwich, yet when it has been applied to the desired substrate the wet paper sheet base is easily lifted from the plastic film.

In FIG. VII, the decal of FIG. III has been soaked in water and pressed with its plastic sheet face (4) against the porous surface (8) of a paper Bristol board (7), that may be dry or that has been soaked in water. The paper sheet base (1) of the decal of FIG. III is being pulled away from its film/image layer, which remains on the surface (8) of paper (7) which thus serves as an intermediate transfer sheet. Image (5) now appears on the transfer sheet (7) in reverse. Paper (7) carrying film (4) and image (5) can then be used wet, as taught in the aforesaid patent application, to apply the film/image to a substrate and the image (5) will appear "right" on the substrate.

It may be mentioned here that instead of using a paper with porous surface as an intermediate transfer sheet, which when wet will release the transferred film as just described, one may use a one-side coated paper of FIG. 1 as an intermediate transfer sheet with the uncoated surface receiving the film to be transferred.

FIG. VIII shows the decal of FIG. VII, after the paper (1) has been removed and the image/film (5/4) covered with a heat activated adhesive polyester film (9), over which an ironing tissue (10) has been placed.

FIG. IX shows FIG. VIII after the heat activated adhesive film (9) has been ironed on to the image/film (5/4), and the intermediate carrier paper (7), as well as the ironing tissue (10) have been removed by soaking in water. Like the decal shown in FIG. V, this one may be used for overhead projection, and will cling to a number of surfaces if wetted slightly.

FIG. X shows the decal of FIG. IX applied on a substrate (6), such as a T-shirt, the film/image (4/5) firmly adhering to the fabric by means of the heat activated adhesive film (9).

EXAMPLES

In each of the following examples, one of the following two papers was used as the one-side coated paper sheet base; they are similar and give substantially equivalent results:

Kimberly-Clark 100 gram paper. Sized from both sides with starch. Coated on one side with pigment plus adhesive binder. The white coating pigment is largely clay, with small amounts of calcium carbonate and titanium dioxide.

Similar paper from San Rafael S. A. de C. V. Both of these papers are made in Mexico and can be purchased on the open market.

Transfers of Pictures Located on Other Papers

Example 1: A magazine picture was transferred to a wood plaque in the following manner:

a) The picture was cut out with a margin of ½ inch. A piece of one-side coated paper in accordance with FIG. 1, intended to serve as the support sheet for the transfer, with a margin of ½ inch in relation to the magazine paper was also cut out.

b) The picture and the non-coated side of the support sheet were each given one coat of a 46% solid content acrylic polymer emulsion.

c) Without waiting for the acrylic coating to dry, the coated picture, face down, was applied over the acrylic coating of the support sheet. Pressure was applied, and the laminate set aside to dry.

d) After a sufficient period of drying, the laminate was placed on a paper towel, paper backing of picture up. Water was applied over the paper backing, utilizing a sponge. Care was taken that no water reached the reverse side of the support sheet.

e) After a few minutes, the magazine paper got saturated with water, and separated from the picture, which remained on the support sheet, firmly adhering to the acrylic plastic film coating. (Water may spill over the edges of the picture, without any harm done, as the whole of the support sheet is covered with acrylic coating. However, it must not be permiteed to enter beyond the edges of the support sheet).

f) The support sheet with the picture, appearing in reverse, was trimmed to the desired shape and size.

g) The laminate was submerged in water for a few minutes.

h) The laminate was placed on a paper napkin, reverse image up, and coated with the same acrylic emulsion.

i) The laminate was placed in position on a piece of wood, coated reverse side of picture down. Pressure was applied.

j) After a few minutes, water was applied over the support sheet, which became saturated in a few minutes, whereafter the paper was removed, with care, as the emulsion was still wet, leaving the picture adhering to the wood plaque, the bond still in the stage of drying. (The two previous coatings, the one of the picture and the one of the support sheet, which were completely dry, give the image sufficient support during this application).

Example 2: An art reproduction was transferred to canvas in the following manner:

a) The picture was cut out with a margin of ½ inch. A support paper of FIG. I, with a margin of ½ inch in relation to the art reproduction paper was also cut out.

b) The picture and the non-coated side of the support sheet were each given one coat of a 46% solid content acrylic polymer emulsion.

c) After a sufficient period for the coatings to dry to the touch, about 10 minutes, the coated picture was placed, face down, over the acrylic emulsion coated surface of the support paper. The sandwich was covered with a tissue paper, and heat and pressure were applied, causing the two acrylic layers to form a strong bond, and the printing ink layer to become part of the joint layer.

d) Thereafter, the laminate was placed on a paper towel, paper backing of picture up. Water was applied over the paper backing, utilizing a sponge. Care was taken that no water reached the reverse side of the support sheet.

e) After a few minutes, the art reproduction paper backing, which was a coated letterpress paper, got saturated with water, and separated from the picture, which remained on the support sheet, firmly adhering to the acrylic coating. (Water may spill over the edges of the picture, without any harm done, as the whole of the support sheet is covered with acrylic coating. However, it must not be permitted to enter beyond the edges of the support sheet).

f) The support sheet with the picture appearing in reverse, i.e., as a mirror image, was trimmed to the desired shape and size.

g) The laminate was submerged in water for a few minutes.

h) The laminate was placed on a paper napkin, reverse image up, and coated with the same acrylic emulsion.

i) The laminate was placed in position on a piece of canvas, which had previously been given a coat of white acrylic paint, coated reverse side of picture down. Heat and pressure were applied, utilizing a domestic iron.

j) Thereafter, water was applied over the support sheet, which became saturated in a few minutes, whereafter it was removed, leaving the picture adhering to the canvas, protected by the layer of acrylic lacquer.

Transfer of Pictures Located on the Support Paper, Including Utilization of a Tissue or Bond Paper for Ironing and Lamination Example 3: An image was printed "right" on the non-coated side of a paper in accordance with FIG. I, utilizing vinyl base printing inks. The printed sheet was, thereafter placed with the printed side in contact with a 2 mil thick film of polyvinyl chloride, supported by a paper napkin. Tissue paper was placed over the support paper, whereafter the sandwich was ironed for 20 seconds at a setting of the iron between wool and cotton, about 150 C. The laminate was thereafter submerged in water for a few minutes, whereafter the tissue and picture paper backing were removed, and the surface cleaned. The sheet of PVC film was then trimmed to desired shape and size, and utilized as an electrostatic decal, clinging to glass, through which it was viewed.

Example 4: A photocopy of a woodworking pattern was first copied on a sheet of transparent plastic, whereafter the resultant transparency was copied on to a paper in accordance with FIG. I non-coated side, on which surface it appeared in reverse, i.e., as a mirror image. The pattern thereafter, was given two coats of acrylic polymer emulsion, and the coating cured by placing a release paper over it, when dry to the touch, and ironing with a domestic flat-iron at polyester setting for 2 minutes. The piece of wood was also given a coat of the acrylic polymer emulsion in the area where the pattern was to be applied. Next, the coated photocopy was submerged in water for 5 minutes, whereafter it was removed and pressed down in the desired position on the piece of wood, face down. Using a sponge and some water, the support sheet was removed, leaving the pattern clinging to the coated wood surface. The transfer was wiped clean and dry and air bubbles sponged out, whereafter it was given a coat of the same acrylic polymer emulsion. After a while, the transfer surface became dry to the touch, while the underside became tacky, through molecular migration, the bond obtaining full strength in a matter of 24 hours.

Example 5: A color laser copy was obtained on the non-coated side of a paper in accordance with FIG. I, the copy appearing in reverse, i.e., as a mirror image, which had been achieved by placing the negative, from which the copy was made, in reverse in the copying machine. The picture was given two coats of acrylic emulsion, which layer was then cured in the manner stated in Example 4. The sheet was thereafter submerged in water for 5 minutes, whereafter it was placed on a paper towel, face up, cleaned and given a coat of acrylic polymer emulsion. While the emulsion was still wet, the sheet was placed in desired position on a sheet of art canvas, face down. Heat and pressure was applied, utilizing a heat transfer machine. Water was, thereafter, applied to the support paper, which was removed in a matter of seconds, leaving the picture firmly adhering to the canvas, having adopted its texture.

Example 6: A picture, printed right on the support sheet non-coated side, was covered with one coat of a PVA (polyvinyl acetate) based clear emulsion, which was thereafter cured in an oven. The coated picture was then laminated to a sheet of transparent PVC (polyvinyl chloride) film, utilizing a domestic iron. In order not to destroy the PVC film surface, it was covered with tissue paper, and the time and temperature of the lamination so adjusted that the tissue paper stuck to the surface of the PVC film, but could still be removed with water. Next, the laminate was submerged in water for a few minutes, whereafter the tissue and the support sheet were removed, leaving the picture adhering to the PVC surface, in reverse if viewed from the picture side, and right if seen through the film. The film with the transfer was thereafter placed with the picture against the uncoated surface of a sheet of white adhesive coated vinyl, having a release liner protecting the adhesive side. The laminate was covered with a tissue paper and ironed with a domestic flat iron for 20 seconds at an iron setting between wool and cotton. The tissue paper was thereafter removed with a sponge and some water, leaving the transferred picture adhering to the sheet of white PVC film, protected by the transparent film to which the picture was originally transferred, the end product laminate being a so-called bumpersticker. When used, the release liner of the white PVC film is first removed, whereafter the adhesive film carrying the picture is applied on the bumper or other desired surface.

Example 7: A pattern, intended to be painted after transfer, was first copied in reverse on the non-coated side of a support sheet of this invention and, thereafter, coated with a layer of PVA based emulsion. After curing in an oven, the coated pattern was laminated to a film of white polyurethane plastic, with the coated pattern in contact with the polyurethane film, using a domestic iron. During the lamination, the film was covered with a tissue paper, to protect its surface. The laminate was, thereafter, trimmed to desired shape and size, whereafter it was submerged in water. After a few minutes, the tissue and support paper were removed, leaving the pattern adhering to the surface of the film. The pattern was, thereafter, covered with a heat curable polyvinyl acetate based paste to protect it and to make the transfer soft, the paste remaining creamy until heated. The decal was then placed in desired position on a sweatshirt, with the white polyurethane film in contact with the fabric. The laminate was covered with a silicone coated release paper and ironed-on to the sweatshirt, utilizing a domestic iron at "cotton" setting during 60 seconds. After a period of cooling, the release paper was removed, leaving the transferred pattern integrated with the fabric, ready for painting.

Example 8: A picture, intended for transfer to a white T-shirt, was printed on the support sheet non-coated side, whereafter it was laminated to a 1 mil transparent polyurethane film, using a polyvinyl acetate (PVA) based adhesive. The laminate was submerged in water for a few minutes, whereafter the support sheet was removed, the print adhering to the polyurethane film, in reverse. The film was, thereafter, placed on a paper towel, reverse picture up. This was cleaned, whereafter it was covered with another sheet of 1 mil transparent polyurethane film, which was then laminated over the reverse picture, by covering with a paper napkin and using a domestic iron, at "wool" setting, for 20 seconds. The laminate was then trimmed to the desired shape, whereafter it was placed reverse side down in position on the T-shirt, covered with a release paper, and ironed-on to the fabric for 60 seconds at "cotton." After a period of cooling, the release paper was removed, leaving the decal integrated in the fabric of the T-shirt.

Example 9: A picture, intended for transfer to a pair of blue jeans, was printed on the support sheet non-coated side, whereafter it was laminated to a 1 mil transparent polyurethane film, using a polyvinyl acetate (PVA) based adhesive. The laminate was submerged in water for a few minutes, whereafter the support sheet was removed, the print adhering to the polyurethane film, in reverse. The film was, thereafter, placed on a paper towel, reverse picture up. This was cleaned, whereafter it was covered with a sheet of 1 mil white polyurethane film, which was then laminated over the reverse picture, covered with a tissue paper, using a domestic iron, at "wool" setting, for 20 seconds. The tissue paper was removed and the laminate was then trimmed to the desired shape, whereafter it was placed, picture up, in position on the jeans, covered with a release paper, and ironed-on to the fabric for 60 seconds at "cotton." After a period of cooling, the release paper was removed, leaving the decal integrated in the denim fabric of the jeans.

Example 10: A one-side coated paper in accordance with FIG. I was coated on the non-coated side with pressure-sensitive adhesive, which layer was then covered for protection with a silicone-coated release liner. This adhesive-coated sheet was then set aside for use as described later in this Example.

A color laser copy was obtained on the non-coated side of a paper in accordance with FIG. I. The copy was given two coats of an acrylic emulsion. After a period of 2 hours, the coated copy was submerged in water, together with a sheet of white paper board having a porous surface. After 5 minutes of soaking, the coated picture and the board were removed from the water and respective surfaces wiped clean of superfluous water. The coated picture was thereafter placed with its coated surface in contact with the board surface, and pressed down with the finger tips in order to obtain good contact. The picture paper backing was thereafter penetrated at the center, whereafter it was removed entirely, which was done in a few large pieces of paper. The picture, now in reverse and completely free from any paper rests, was wiped dry.

Pressure sensitive adhesive was then applied to the picture by use of the adhesive coated sheet described at the beginning of this Example. The release liner was removed from that sheet and the sheet submerged in water for 5 minutes. It was then pressed with its adhesive side against the (reverse) picture supported on the wet paper board. The coated paper sheet base backing of the adhesive, having been wetted, was readily removed, leaving the pressure sensitive adhesive on the surface of the picture.

The adhesive side of the resulting laminate was then pressed into contact with the surface of a T-shirt. The paper board, which was still wet, was then removed, leaving the picture right side up on the T-shirt, but with little or no adhesion because the pressure-sensitive adhesive was still wet. The picture was covered with a silicone-treated release paper and ironed for one minute at a setting between highest wool and cotton (about 175 C.). After a few minutes of cooling the ironing sheet was removed, leaving the picture firmly adhering to the fabric of the T-shirt.

Example 11: The feasibility of manufacturing decals for commercial use was tested in the following manner:

An image was printed in offset (in reverse) on the non-coated side of a paper in accordance with FIG. I, using the same printing inks intended for the production. The image was thereafter given one coat of an acrylic emulsion of the same kind to be used in the coating machine where the production coating would be made. Finally, the coated image was given one coat of a pressure-sensitive adhesive, and covered with a release liner, all of which was to be made in the coating machine during the production stage. The resultant decals were then tested as follows:

a) The release liner was removed.
b) The decal was submerged in water for 3 minutes.
c) The decal was removed from the water and superfluous water was wiped away, whereafter the decal was placed in the desired position, with the pressure-sensitive adhesive in contact with the substrate.
d) The decal was pressed down with the finger tips, in order to obtain good contact.
e) The image paper backing was removed.

Example 12: A decal was prepared and applied on a T-shirt in the same manner as described in Example 11. In order to make the decal machine washable, a sixth step was added, as follows:

f) The transferred picture was covered with a silicone coated release paper, and ironed for one minute with a flat domestic iron at a "wool" temperature setting. After a short period of cooling, the release paper was removed, leaving the transferred image permanently adhering to the fabric.

I claim:

1. A decal comprising a dry paper sheet base in which the pores of the paper have been filled with solid material such that a surface thereof is non-coated and not substantially porous but is essentially free from non-water-soluble opaque filler material, an image applied on said non-porous surface, and a plastic film applied over said image and not penetrating said non-porous surface of the paper, said paper when wet being easily releasable from the image and plastic film.

2. A decal according to claim 1, wherein said paper sheet base is a paper coated on only one side with a binder and optionally pigment, and the opposite non-coated side is the surface on which the image is applied.

3. A decal according to claim 1, wherein said image is applied by xerographic copying.

4. A decal according to claim 1, wherein said image is applied by laser printing.

5. A decal according to claim 1, wherein said plastic film is applied as an acrylic emulsion and dried.

6. A decal comprising a dry paper sheet base in which the pores of the paper have been filled with solid material such that a surface thereof is non-coated and not substantially porous but is essentially free from non-water-soluble opaque filler material, a plastic film applied on said non-porous surface and not penetrating same, and an image applied on said plastic film, said paper when wet being easily releasable from the plastic film.

7. A decal according to claim 6, wherein said paper sheet base is a paper coated on only one side with a binder and optionally pigment, and the opposite non-coated side is the surface on which the plastic film is applied.

8. A decal according to claim 1, pressed with the plastic film against an intermediate paper transfer sheet having a porous surface so that the plastic film, with image and paper sheet base still attached, adheres well to the porous surface and adopts the texture of the same but does not penetrate it.

9. A decal according to claim 1 that has been wetted with water.

10. A decal according to claim 6 that has been wetted with water.

11. A decal according to claim 6, wherein said plastic film is applied as an acrylic emulsion and dried.

12. A decal according to claim 1, wherein said plastic film is applied as a liquid form of a film-forming polymer and then solidified.

13. A decal according to claim 6, wherein said plastic film is applied as a liquid form of a film-forming polymer and then solidifed.

14. A decal according to claim 1, wherein said plastic film is applied as a pre-formed film.

15. A decal according to claim 6, wherein said plastic film is applied as a pre-formed film.

16. A decal according to claim 8, wherein said intermediate paper transfer sheet is wet with water.

17. A decal comprising a dry paper sheet base coated on only one side with a binder and pigment such that the pores of the paper have been filled with binder and pigment and the opposite non-coated side is a substantially non-porous surface essentially free from non-water-soluble opaque filler material, a plastic film applied on said non-porous surface and not penetrating same, and an image applied on said non-porous surface or on said plastic film or on both, said paper when wet begin easily releasable from the image and plastic film.

18. A decal according to claim 17, wherein said plastic film is applied as a liquid form of a film-forming polymer and then solidified.

19. A decal according to claim 18, wherein said plastic film is applied as an acrylic emulsion and dried.

* * * * *